3,639,469
PROCESS FOR THE PRODUCTION OF
4,4'-BIPHENYL DISULFONYL CHLORIDE
Shigeto Suzuki, San Francisco, Calif., assignor to Chevron Research Company, San Francisco, Calif.
No Drawing. Filed May 1, 1968, Ser. No. 725,951
Int. Cl. C07c 143/70
U.S. Cl. 260—543 R       11 Claims

ABSTRACT OF THE DISCLOSURE

At elevated temperature carbon tetrachloride in the liquid phase reacts with 4,4'-biphenyl disulfonic acid to yield disulfonyl chloride. Sulfuric, phosphoric and polyphosphoric acids catalyze the reaction at a temperature in the range 130 to 225° C.

This invention relates to a process for the production of disulfonyl chlorides of the formula

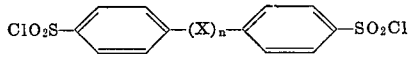

in which X is O, S, SO, $SO_2$ and CO and $n$ is zero or one. More particularly, it relates to the reaction of the sulfonic acids corresponding to the above dichlorides with carbon tetrachloride in the liquid phase.

The subject disulfonyl chlorides are useful bifunctional compounds. In their reactions with bifunctional alcohols, phenols, diamines and the like, linear high melting polymers are formed. They are also useful, as known in the art, for the production of soluble, fusible aromatic polymeric materials by heating at an elevated temperature a mixture of the dichloride in a suitable aromatic hydrocarbon, for example, benzene, biphenyl, diphenyl ether and the like (cf. British Pat. 1,037,111).

It has now been found that disulfonyl chlorides of the formula

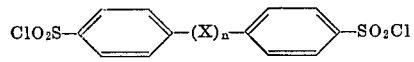

in which X is an oxide, sulfide, sulfoxide, sulfone or carbonyl group and in which $n$ is zero or one are produced by the reaction of the corresponding disulfonic acid with carbon tetrachloride in the liquid phase. Reaction temperatures are in the range above about 130° C. and below the thermal decomposition temperature of the resulting disulfonyl chloride. Sufficient pressure must be applied upon the reaction system to maintain carbon tetrachloride in the liquid phase. The reaction proceeds in the absence of a catalyst. Substantial improvement in the rate, however, is experienced in the presence of strong mineral acids which catalyze the reaction. A subsantially stoichiometric amount of the tetrachloride relative to the sulfonic acid is required for satisfactory results. Although the disulfonic acid feed compounds for the process have little or no solubility in general in carbon tetrachloride, surprisingly the heating of the subtsantially heterogeneous reaction mixture as described above results in excellent conversions to the desired dichlorides.

In a preferred embodiment a mixture in the ratio of three mols of carbon tetrachloride, 0.01 mol of sulfuric acid and one mole of the disulfonic acid is charged to a pressure autoclave and heated at 170°–200° C. for about 2 hours under autogenous pressure while efficiently stirring the reactants. The reactor and contents are cooled and the reactor vented. Under these conditions yields of the disulfonyl chloride are of the order of 90 mol percent based upon the sulfonic acid feed.

The amount of carbon tetrachloride used in the process should be as a minimum at least substantially the stoichiometric requirement, e.g., from about 1.8 to 2.2 mols per mol of the disulfonic acid. The presence of an excess of carbon tetrachloride in the reaction mixture is usually advantageous. The produced disulfonyl chloride is in general soluble in the tetrachloride, and the excess tetrachloride serves as a heat transfer medium, thus tending to minimize local overheating effects in the heterogeneous reaction system. On the other hand, the use of very large excesses of carbon tetrachloride is relatively inefficient. In general, the use of from about 2 to 100 mols of the chloride per mol of the disulfonic acid is satisfactory. The preferred ratio is 1.8–50 to 1.

Inert diluents may be used, but in general it is more advantageous to employ excess carbon tetrachloride for the same purpose.

Satisfactory reaction temperatures are in the range from about 130° C. and below the thermal decomposition temperature of the disulfonyl chloride being produced. The threshold temperature for the reaction is about 130° C. At lower temperatures the reaction rate becomes impracticably slow. At 130° C. after a 10–20 minute reaction time, an appreciable amount of the disulfonyl chloride is in general produced. Above about 200°–225° C. thermal decomposition side reactions involving the disulfonyl chloride become an increasingly undesirable factor. The reaction rate dependence upon temperature is conventional, i.e., the rate increases with an increase in temperature.

Substantial conversions and yields are experienced in general after an elapsed reaction time of 2–5 hours. At 180° C. the reaction is complete in about 3–4 hours. At about 200° C. satisfactory reaction times are in the range from about ½ to 1 hour. In general, depending upon the temperature employed, reaction times should be in the range from about 0.5 to 10 hours.

In the absence of added mineral acid, carbon tetrachloride reacts with the subject disulfonic acids. Best results are obtained when the reaction is acid catalyzed. Strong mineral acids are in general satisfactory catalysts. Relatively non-volatile mineral acids such as sulfuric, phosphoric and polyphosphoric acids are preferred catalysts. Of these, sulfuric acid is most preferable.

A trace amount, i.e., about 0.001 mol of mineral acid per mol of the disulfonic acid, of added acid results in a notable improvement in the reaction rate. From about 0.01 to 0.5 mol of mineral acid per mol of the disulfonic should be employed in the instant process. Larger relative amounts of mineral acid can be used except that product recoveries become in general more complicated. Most preferably, for each mol of the disulfonic acid, from about 0.05 to 0.1 mol of mineral acid is employed.

Representative disulfonic acid feed compounds for the process include 4,4'-biphenyl disufulonic, 4,4'-biphenylether disulfonic, 4,4'-biphenylthioether disulfonic, 4,4'-biphenylsulfoxide, disulfonic, 4,4'-biphenylsulfone disulfonic, 4,4'-benzophenone disulfonic, e.g., 4,4'-biphenyl and pseudo-biphenyl disulfonic acids.

The following examples further illustrate the invention.

EXAMPLE 1

A mixture of 4,4'-biphenyl disulfonic acid and carbon tetrachloride in the mol ratio 1:10, respectively, was charged to a corrosion resistant pressure reactor equipped with a magnetic stirrer, a temperature measuring device and a gas relief valve. The mixture was heated and stirred at 180° C. for 3 hours. The maximum pressure during the reaction was 190–200 p.s.i.g. The reaction was stopped by rapidly cooling the reaction system. The yield of 4,4'-biphenyl disulfonyl chloride was 48 mol percent.

EXAMPLE 2

As in Example 1, the disulfonyl chloride was produced, except that for each mol of the disulfonic acid about 0.01 mol of sulfuric acid was added and the reactants were heated for 3 hours. The yield of 4,4'-biphenyl disulfonyl chloride was 88 mol percent.

When phosphoric and polyphosphoric acids are used in place of sulfuric acid, a similar improvement in the results occurs.

Similar results obtained when pseudo-biphenyl disulfonic acids as defined above are used as process feed compounds.

As the range of embodiments of this invention is wide, and many may appear to be widely different, yet not depart from the spirit and scope thereof, it is to be understood that this invention is not limited to specific embodiments thereof, except as defined in the appended claims.

What is claimed is:

1. The process for the production of 4,4'-biphenyl disulfonyl chloride, which comprises reacting 4,4'-biphenyl disulfonic acid with carbon tetrachloride by heating a mixture of the reactants at a temperature above about 130° C. and below the thermal decomposition temperature of the disulfonyl chloride and at a pressure sufficient to maintain carbon tetrachloride in the liquid phase, wherein for each mol of the disulfonic acid in the mixture from about 1.8 to 100 mols of the tetrachloride is present, and wherein said heating is for a period in the range from about 0.5 to 10 hours.

2. The process as in claim 1 wherein said reaction is catalysed by a strong mineral acid selected from the group consisting of sulfuric, phosphoric and polyphosphoric acids.

3. The process as in claim 2 wherein the amount of said acid catalyst is the mixture per mol of the disulfonic acid is in the range from 0.001 to 0.5 mol.

4. The process as in claim 2 wherein said catalyst is sulfuric acid which is present in said mixture in an amount in the range from 0.05 to 0.1 mol per mol of the disulfonic acid.

5. The process as in claim 1 wherein substantially the stoichiometric amount of carbon tetrachloride is present in the mixture.

6. The process for the production of 4,4'-biphenyl disulfonyl chloride from 4,4'-biphenyl disulfonic acid consisting essentially of reacting said disulfonic acid with carbon tetrachloride by heating a mixture of the reactants at a temperature in the range 130° C. to 200–225° C. and at a pressure sufficient to maintain carbon tetrachloride in the liquid phase, wherein for each mol of the disulfonic acid in the mixture an amount of the tetrachloride in the range 1.8 to 100 mols is present, and wherein said heating is for a period in the range from about 0.5 to 10 hours.

7. The process as in claim 6 wherein said reaction is catalysed by sulfuric acids.

8. The process as in claim 6 wherein substantially the stoichiometric amount of carbon tetrachloride is present in the mixture.

9. The process as in claim 7 wherein for each mol of the disulfonic acid an amount of the catalyst in the range from 0.05 to 0.1 mol is present in the mixture.

10. The process for the production of 4,4'-biphenyl disulfonyl chloride from 4,4'-biphenyl disulfonic acid which comprises reacting carbon tetrochloride with the disulfonic acid by heating a mixture of the disulfonic acid and tetrachloride in the ratio of 1 to 10 mols, respectively, at a temperature of about 180° C. and at a pressure of 190–200 p.s.i.g. for a period of about three hours, wherein said mixture contains about 0.01 mol of sulfuric acid per mole of the disulfonic acid.

11. The process for the production of 4,4'-biphenyl disulfonyl chloride from 4,4'-biphenyl disulfonic acid which comprises reacting carbon tetrochloride with the disulfonic acid by heating a mixture of the disulfonic acid and tetrachloride in the ratio of 1 to 10 mols, respectively, at a temperature of about 180° C. and at a pressure of 190–200 p.s.i.g. for a period of about 3 hours, thereby producing the disulfonyl chloride.

References Cited
UNITED STATES PATENTS

| | | | |
|---|---|---|---|
| 2,946,815 | 7/1960 | Hamor | 260—470 |
| 2,806,061 | 9/1957 | Wygant | 260—544 |

FOREIGN PATENTS

| | | |
|---|---|---|
| 135,482 | 5/1960 | U.S.S.R. |

LEWIS GOTTS, Primary Examiner

E. J. GLEIMAN, Assistant Examiner